Aug. 23, 1960  F. GREGOR  2,949,747
METHOD AND APPARATUS FOR CONTROLLING THE TOOLING OR
HARDENING OF CHOCOLATE CANDIES
Filed Aug. 19, 1957
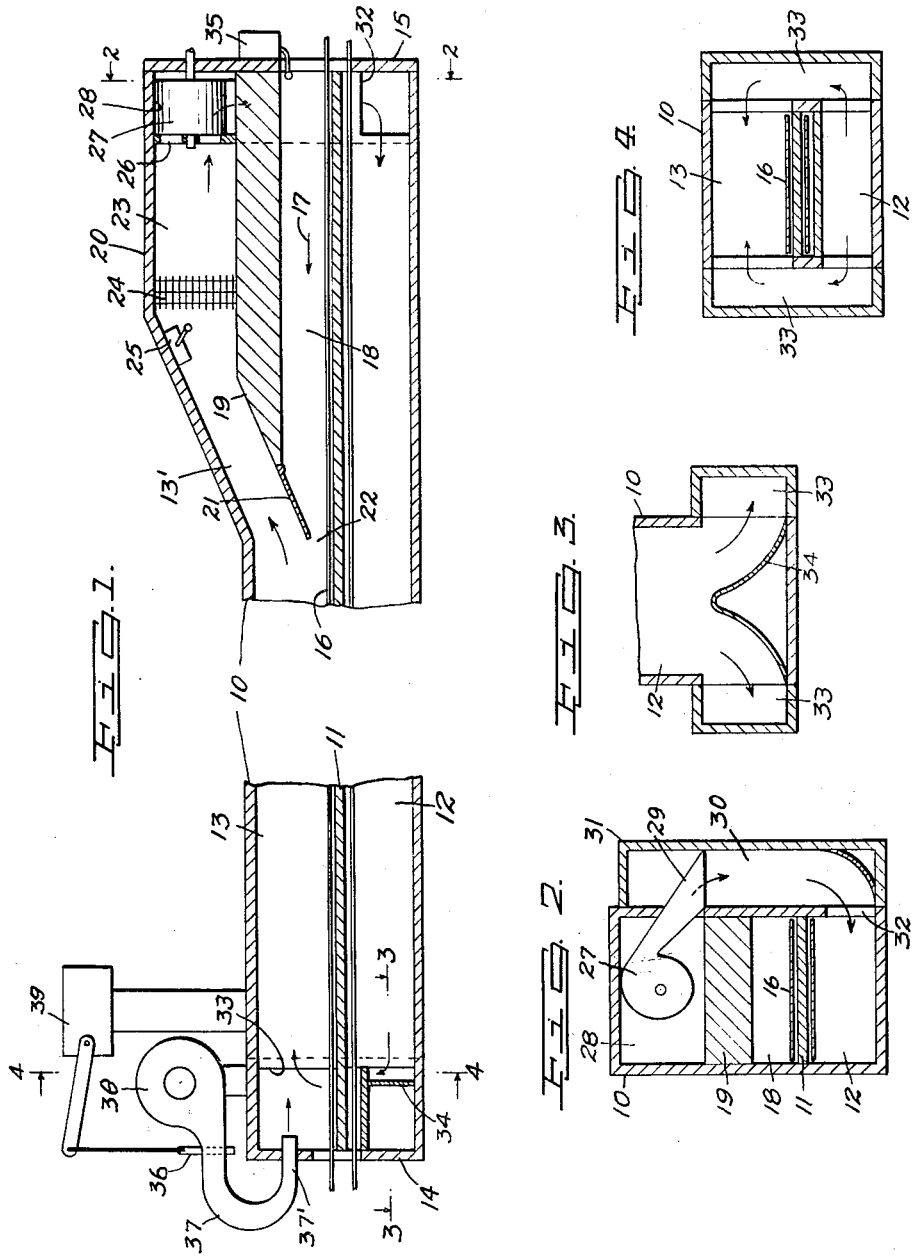
INVENTOR.
FRED GREGOR
BY
Howard Thompson
ATTORNEY

United States Patent Office 2,949,747
Patented Aug. 23, 1960

2,949,747

METHOD AND APPARATUS FOR CONTROLLING THE TOOLING OR HARDENING OF CHOCOLATE CANDIES

Fred Gregor, 50 Browne St., Brookline, Mass.

Filed Aug. 19, 1957, Ser. No. 678,867

4 Claims. (Cl. 62—129)

This invention relates to apparatus, generally referred to as cooling tunnels, through which chocolate candies are passed on a conveyor belt in the operation of setting or hardening the chocolate. More particularly, the invention consists in modifying apparatus of this type and kind so as to provide a more positive control of the temperatures of the circulated air in order to produce the most desired end results in the production of chocolate candies.

Still more particularly, the invention deals with a novel method of temperature and air circulation control in the production of chocolate candies.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic broken sectional view, through a cooling or setting tunnel, diagrammatically illustrating the apparatus for controlling temperature and air circulation through the tunnel.

Fig. 2 is a section on the line 2—2 of Fig. 1, omitting background showing.

Fig. 3 is a partial section on the line 3—3 of Fig. 1; and

Fig. 4 is a partial section on the line 4—4 of Fig. 1 of the tunnel structure only of the apparatus.

To illustrate one adaptation and use of my invention, I have illustrated one type of tunnel apparatus and, in the drawing, 10 represents an elongated tunnel, having a longitudinal partition 11 dividing the tunnel into a lower air circulating passage or chamber 12 and an upper air circulating passage or chamber 13. End walls 14 and 15 of the tunnel are open for passage of an endless belt or conveyor 16 therethrough, the belt passing above and below the partition 11, the upper part of the belt feeding in the direction of the arrow 17 of Fig. 1 of the drawing. For purposes of description, the end of the tunnel, at the wall 15, can be regarded as the admission end and the other end, at the wall 14, can be regarded as the discharge end.

It will, thus, be apparent that candies deposited upon the belt or chocolate covered candies will first enter a passage or chamber 18 located between the partition 11 and a supplemental partition 19 disposed in the raised end portion 20 of the tunnel. The partition 19 has an extending adjustable baffle 21, controlling the passage 22 between the chamber 18 and the chamber 13. This passage is sufficiently high to freely pass candies deposited upon the belt 16.

Formed between the partition 19 and the raised wall portion 20 is a refrigerating chamber or passage 23, in which a suitable refrigerating element, diagrammatically seen at 24, is arranged. Adjacent the element 24 is a thermostat 25 automatically controlling the element 24 to control temperature of air in chamber 13'.

The chamber 23 has a partition wall 26, having one or more openings into a blower 27 supported in an upper compartment 28. The blower 27 has a discharge duct 29, note Fig. 2, for directing air into a bypass passage 30 formed in an extending housing 31 at one side of the tunnel, as clearly noted in Fig. 2. The bypass passage 30 has a discharge 32, at its lower end, which opens into one side of the chamber 12, as clearly noted in Figs. 1 and 2 of the drawing.

The tunnel apparatus also includes bypass passages 33, note Fig. 4, which open into opposed sides of the end of the chamber 13 adjacent the wall 14 and also into the corresponding end of the passage 12 and in said end of the passage 12 is a double flared baffle 34 for directing the air to the bypass passages 33, as will clearly appear from a consideration of Fig. 3. In other words, air circulating from right to left through the passage 12, as indicated by the several arrows, passes into and upwardly through the bypass passages 33, then into the end of the passage 13 and, then, longitudinally of said passage and is directed upwardly to the passage 23 through the upwardly inclined extension 13' of the passage 13, the air being guided in this direction by the baffle 21, as is clearly noted in Fig. 1 of the drawing. The air is forcefully drawn through the element 24, the passage 23 and discharged through the bypass 30 into the forward end of the passage 12 through the port 32. This completes the circulation of air.

From the foregoing description, it can be seen that there is no forced air circulation through chamber 18 between the admission end and baffle 21. Chamber 18 is cooled only through convection from the other cold parts of the funnel in a haphazard way and there is no actual temperature control in this tunnel section. Beyond that, hot air from the room adjacent the wall 15 may enter the admission end of the tunnel and offset temperature and humidity conditions in chamber 18. My control of chamber 18 is later described.

It is a well established fact that, in the art of manufacturing chocolate products, to transfer chocolate from a liquid to a solid state must be done slowly in the beginning. Fast chilling will form a skin on the chocolate, under which the chocolate will not solidify properly. Lack of cooling during the travel of chocolate through chamber 18 from the admission end to the baffle 21 will admit the chocolate in a too liquid state into the chamber 13, where it is subjected to the blast of cold air circulated through this chamber and, again, will cause the above mentioned condition.

My invention provides control temperatures in the chamber 18 between the admission end and the baffle 21, providing an admission temperature of approximately 70° F. which becomes continuously lower as it approaches the baffle 21 and will enter chamber 13 at a temperature of approximately 53° F.

I have modified the above partially described tunnel apparatus in carrying out the invention by mounting a thermostat 35 at the entrance end of the chamber 18 and this thermostat controls operation of a plate valve 36 movable across the discharge 37 of a rotary blower 38 mounted upon the discharge end of the tunnel. The plate valve 36 is actuated through a suitable mechanism, as at 39, which is controlled by the thermostat 35. The discharge of the blower 38 opens into the end of the chamber 13 through the end wall 14.

The end 37' of the discharge 37 from the rotary blower 38 preferably extends the full width of the tunnel or passage 13, so that air discharged will readily mix with the air moving through the passage 13 throughout its entire width.

With my improved controls for apparatus of the character described, the method of operation is substantially as follows:

At the admission end of the tunnel, adjacent the wall 15, the temperature of the environment is maintained in the neighborhood of 85° F. and, at this time, it is pointed out, in later reference to degrees, Fahrenheit will be the scale of measure. The discharge end in wall 14 opens into a chocolate packing room, where the temperature is approximately 65° F. and a humidity of approximately 50% maintained. Air passing through the element 24 into the chamber 23 and, thus, down into the passage 22 through passage 30 will enter the chamber 12 at substantially 40° F. The air, in passing through the chamber 12 to the discharge end, will be heated to some degree by the heat of the candies passed through the chamber 13 and, thus, this air, in passing upwardly through the bypass passages 33 will be discharged into said end of the chamber 13 at substantially 46°, the air, passing over the candies fed through the chamber 13 as the belt feeds said candies through the chamber 13 in the direction of the arrow 17, will be raised to approximately 53° F. in movement through the chamber 13' and this air is then passed through the element 24 in again reducing the temperature to approximately 40° F. for re-circulation.

With my improvement, the blower 38 introduces air into the chamber 13 from a packing room environment where the air is maintained substantially at 65° F. and where humidity is at approximately fifty percent. By forcing this charge of air into the passage 13 in addition to the normal circulation of air, I create what might be termed a pressurized air in the tunnel which acts to check admission of air into the passage 18 at the prevailing substantially 85° F. temperature which prevails outwardly of the admission end in wall 15.

Thermostat 35 is set at 70° F. thus, if blower 38 should add too much air to the air circulated through the tunnel, the surplus air will escape through the admission end in wall 15, cooling the thermostat 35. When this condition arises, thermostat 35 will actuate the mechanism 39 which, in turn, will operate the plate valve 36 and cut down the pressurized air flow until the temperature at thermostat 35 reaches approximately 70° F. It will be apparent that the blower 27 circulates air at a greater velocity than the injection of air by blower 38.

On the other hand, if, due to any condition, the temperature at thermostat 35 goes above 70° F., the thermostat 35 will then actuate mechanism 39 which will actuate the plate valve 36 to admit more air into the chamber 13. This additional air will force the warm air out through the admission end in wall 15, until the temperature at thermostat 35 is lowered to approximately 70° F., this again maintaining in the chamber 18 the balanced desired temperature.

In referring to chocolate candies, it will be understood that this implies also candies which are chocolate coated and it will be understood that the illustration above given with respect to temperatures is simply illustrative of controls, which are usually desired and are modified in degrees with respect to conditions which prevail and characteristics of the chocolate employed in forming the resulting end product.

Having fully described my invention, what I claim as new and desire to secure by Letters Patent is:

1. In tunnel apparatus of the character described having admission and discharge ends, said apparatus, employing an upper passage and a lower passage, a longitudinal partition dividing said passages, means dividing the upper passage at the admission end of the apparatus, into an upper refrigerant passage and a lower candy admission passage, means exposed to the candy admission passage at the admission end thereof automatically controlling a booster charge of air into the discharge end of the upper passage of the apparatus in controlling temperature prevailing at the admission end of said candy admission passage, and said booster charge of air pressurizing the air in the candy admission passage to block introduction of air at high temperatures into said candy admission passage.

2. In cooling tunnels for controlling the setting of chocolate candies moved through the tunnel on a conveyor belt from an admission end to a discharge end, the admission end of the tunnel including a chamber into which the candies are initially fed by said conveyor belt, a parition dividing the tunnel into upper and lower circulating passages, inner end of said chamber being exposed to the upper circulating passage, means for circulating air below said chamber and through the circulating passage in the direction of said discharge end and then through the upper circulating passage over said chamber to said admission end, means comprising an automatically actuated booster blower at the discharge end of the tunnel for introducing a booster circulation of air into the upper passage of the tunnel in the direction of the admission end of the tunnel as a partial control of the temperature of air circulated over chocolate candies fed through the tunnel on said conveyor belt, and means controlling operation of said first named means.

3. In cooling tunnels for controlling the setting of chocolate candies moved through the tunnel on a conveyor belt from an admission end to a discharge end, the admission end of the tunnel including a chamber into which the candies are initially fed by said conveyor belt, a partition dividing the tunnel into upper and lower circulating passages, inner end of said chamber being exposed to the upper circulating passage, means for circulating air below said chamber and through the circulating passage in the direction of said discharge end and then through the upper circulating passage over said chamber to said admission end, means comprising an automatically actuated booster blower at the discharge end of the tunnel for introducing a booster circulation of air into the upper passage of the tunnel in the direction of the admission end of the tunnel as a partial control of the temperature of air circulated over chocolate candies fed through the tunnel on said conveyor belt, means controlling operation of said first named means, and said second named means comprising a thermostat exposed to the admission end of said chamber.

4. In cooling tunnels for controlling the setting of chocolate candies moved through the tunnel on a conveyor belt from an admission end to a discharge end, the admission end of the tunnel including a chamber into which the candies are initially fed by said conveyor belt, a partition dividing the tunnel into upper and lower circulating passages, inner end of said chamber being exposed to the upper circulating passage, means for circulating air below said chamber and through the circulating passage in the direction of said discharge end and then through the upper circulating passage over said chamber to said admission end, means comprising an automatically actuated booster blower at the discharge end of the tunnel for introducing a booster circulation of air into the upper passage of the tunnel in the direction of the admission end of the tunnel as a partial control of the temperature of air circulated over chocolate candies fed through the tunnel on said conveyor belt, means controlling operation of said first named means, said second named means comprising a thermostat exposed to the admission end of said chamber, and the discharge of the booster blower into the upper passage of the tunnel being substantially the full width of said upper passage.

References Cited in the file of this patent
UNITED STATES PATENTS

| | | |
|---|---|---|
| 1,753,828 | Greer et al. | Apr. 8, 1930 |
| 2,073,221 | Reece et al. | Mar. 9, 1937 |
| 2,307,562 | Bausman | Jan. 5, 1943 |
| 2,460,150 | Schapp | Jan. 25, 1949 |